(12) United States Patent
Kuai (10) Patent No.: US 12,480,326 B2
(45) Date of Patent: Nov. 25, 2025

(54) VERTICAL CIRCULATING STEREO GARAGE

(71) Applicant: SICHUAN GOLDSTONE-ORIENT NEW MATERIAL TECHNOLOGY CO., LTD., Sichuan (CN)

(72) Inventor: Yixi Kuai, Sichuan (CN)

(73) Assignee: SICHUAN GOLDSTONE-ORIENT NEW MATERIAL TECHNOLOGY CO., LTD, Sichuan (CN)

( * ) Notice: Subject to any disclaimer, the term of this patent is extended or adjusted under 35 U.S.C. 154(b) by 348 days.

(21) Appl. No.: 18/253,353

(22) PCT Filed: Jul. 28, 2021

(86) PCT No.: PCT/CN2021/108988
§ 371 (c)(1),
(2) Date: May 17, 2023

(87) PCT Pub. No.: WO2022/105290
PCT Pub. Date: May 27, 2022

(65) Prior Publication Data
US 2024/0026701 A1 Jan. 25, 2024

(30) Foreign Application Priority Data

Nov. 17, 2020 (CN) .......................... 202011290398.9
Nov. 17, 2020 (CN) .......................... 202022663248.X
Jan. 26, 2021 (CN) .......................... 202120215061.5

(51) Int. Cl.
*E04H 6/14* (2006.01)
*E04H 6/42* (2006.01)
*B60L 53/18* (2019.01)

(52) U.S. Cl.
CPC ............... *E04H 6/14* (2013.01); *E04H 6/42* (2013.01); *B60L 53/18* (2019.02)

(58) Field of Classification Search
CPC .................................. E04H 6/14; B60L 53/18
See application file for complete search history.

(56) References Cited

U.S. PATENT DOCUMENTS 7,602,143 B2 * 10/2009 Capizzo .................... G07F 7/06
320/109
8,461,804 B1 * 6/2013 Capizzo .................. B60L 53/66
320/109

(Continued)

FOREIGN PATENT DOCUMENTS

CN 2497455 Y 6/2002
CN 204793973 U 11/2015

(Continued)

OTHER PUBLICATIONS

English translation of International Search Report from PCT/CN2021/108988 dated Oct. 26, 2021 (3 pages).

*Primary Examiner* — Jonathan Snelting
(74) *Attorney, Agent, or Firm* — Calfee, Halter & Griswold LLP (57) ABSTRACT

The present disclosure relates to the field of parking equipment. Disclosed is a vertical circulating stereo garage, comprising: a machine frame, the machine frame comprising a front main frame and a rear main frame respectively provided with traction chains; a plurality of automobile hanging baskets, each of the automobile hanging baskets being able to be kept at a horizontal state in different parking positions of an annular running area along with the operation of the traction chains; a charging system, the charging system comprising a central cable outlet unit, charging assemblies respectively arranged on the automobile hanging baskets and a plurality of charging cables correspondingly diverging from the central cable outlet unit to various charging assemblies, wherein the space surrounded by the annular running area where the automobile hanging baskets (Continued)

are located is provided with a full-empty area allowing each charging cable to freely hang down, and cable outlet ends of the central cable outlet unit are provided in the full-empty area. In the operation process of the vertical circulating stereo garage, there is no need to change cable outlet positions, or enable the charging cables to enter cable grooves or be pulled out of the cable grooves, so that the problems of energy consumption and wear caused by winding and releasing the charging cables can be avoided.

14 Claims, 8 Drawing Sheets

(56) References Cited

U.S. PATENT DOCUMENTS

2011/0140658 A1* 6/2011 Outwater ................ B60L 53/35
                                                          320/109
2014/0321952 A1* 10/2014 Sala Branchadell ..... E04H 6/14
                                                          414/234
2017/0306641 A1* 10/2017 Qi ........................... B60L 53/00
2020/0094699 A1* 3/2020 Cheng .................... B60L 53/35
2020/0240166 A1* 7/2020 Graner ................... B60L 55/00

FOREIGN PATENT DOCUMENTS

| | | |
|---|---|---|
| CN | 105781178 A | 7/2016 |
| CN | 205476693 U | 8/2016 |
| CN | 206513082 U | 9/2017 |
| CN | 107225993 A | 10/2017 |
| CN | 206971845 U | 2/2018 |
| CN | 208010013 U | 10/2018 |
| CN | 208056744 U | 11/2018 |
| CN | 108952262 A | 12/2018 |
| CN | 109849705 A | 6/2019 |
| CN | 112443185 A | 3/2021 |
| CN | 214034969 U | 8/2021 |
| WO | 2020009257 A | 1/2020 |

* cited by examiner

VERTICAL CIRCULATING STEREO GARAGE

CROSS-REFERENCE TO RELATED APPLICATIONS

This application is a 371 of PCT Application No. PCT/CN2021/108988 filed on Jul. 28, 2021, which claims for the benefit of Chinese Patent Application Nos. 202011290398.9 and 202022663248.X filed on Nov. 17, 2020 and Chinese Patent Application No. 202120215061.5 filed on Jan. 26, 2021, the contents of which are incorporated herein by reference.

FIELD

The present disclosure relates to the field of parking equipment, in particular to a vertical circulating parking system.

BACKGROUND

With the rapid growth of car ownership, parking difficulty has become a severe problem in the development of urbanization. More and more attention is paid to vertical circulating parking systems because of their small floor space, high utilization of land space and flexible layout. Typically, a vertical circulating parking system can drive a transmission mechanism via a gear motor, and thereby drive a plurality of parking baskets arranged on traction chains at intervals to move in loops in a runway-shaped (annular) running area along with the traction chains, so as to attain a purpose of accessing automobiles.

In recent years, the technology of new energy vehicles, represented by electric vehicles, has become increasingly matured, and vertical circulating parking systems with a charging function have emerged as the times require. However, in order to supply power to the charging assemblies (e.g., charging posts and charging guns) on the parking baskets, it is necessary to set up components and structures such as transmission lines for power transmission, which has introduced new technical problems in terms of safety of use and arrangement of components, etc.

In the prior art, the most common power transmission means used in vertical circulating parking systems are sliding contact wires, which provides power for charging electric vehicles by keeping the charging assemblies on the parking baskets electrically connected to a conductive slide rail or channel at different parking positions of the parking baskets. For example, Chinese utility model No. CN205476693U has disclosed a continuous charging system in parking space for a high-rise vertical circulating parking system, which is provided with an annular channel-type conductive slide rail arranged around a revolving chain and a plurality of current collecting devices uniformly distributed on the revolving chain, and the current collecting devices are always in contact with the annular channel-type conductive slide rail in the running process along with the revolving chain to obtain power for the charging posts in the parking spaces. Such power transmission means can't meet the safety protection requirements of open-air electricity consumption, and are not conducive to ensuring the safety of users.

For example, Chinese utility model No. CN204793973U has provided a power supply solution that uses charging cables to transmit power. Specifically, a cable winder for charging cables is added on the circulating guide rail of a vertical circulating parking system and synchronously rotates with the circulating guide rail, a charging cable is wound on the cable winder, one end of the charging cable is connected to a charging gun on an automobile carrier, and the other end of the charging cable is connected to a following turntable arranged outside the circulating guide rail. Thus, in the automobile accessing process, the charging cable winder rotates synchronously with the circulating guide rail and drives the following turntable at the same time, so that the charging cable is circularly wound and released between them. Such a power supply solution can effectively avoid the problem of safety of use incurred by live components, but friction inevitably occurs between the charging cable and related components in the process of winding and releasing of the charging cable, resulting in high operating energy consumption, severe cable wear, and other problems.

CONTENTS OF THE DISCLOSURE

To overcome the problem that it is difficult to arrange the charging cables in vertical circulating parking systems in the prior art, the present disclosure provides a vertical circulating parking system, in which it is unnecessary to change the cable outlet positions or force the charging cables to enter cable grooves or pull the charging cables out of the cable grooves along with the movement of the parking baskets, thereby the problems of energy consumption, cable wear, and outdoor power utilization/power supply safety related with charging cable winding and releasing can be effectively avoided.

To attain the above-mentioned object, in one aspect, the present disclosure provides a vertical circulating parking system, which comprises: a machine frame, comprising a front main frame and a rear main frame that are arranged apart from and opposite to each other and provided with traction chains respectively; a plurality of parking baskets, each of which is respectively connected to different positions of the traction chains in a way that it can be pivoted with respect to the traction chains, so that the parking baskets can be kept in a horizontal state at different parking positions in an annular running area as the traction chains operate; and a charging system, comprising a central cable outlet unit, charging assemblies respectively arranged on the parking baskets, and a plurality of charging cables correspondingly diverging from the central cable outlet unit to the charging assemblies so as to supply power to the charging assemblies, wherein a space surrounded by the annular running area where the plurality of parking baskets are located is provided with a full-empty area allowing the plurality of charging cables to freely hang down, and cable outlet ends of the central cable outlet unit are arranged in the full-empty area.

With the above technical scheme, the vertical circulating parking system in the present disclosure is provided with an full-empty area in the space surrounded by the annular running area of the parking baskets, and the charging cables are led out centrally and diverge and extend through the central cable outlet unit with the cable outlet end arranged in the full-empty area, so that the charging cables can freely hand down in the full-empty area without being blocked or interfered by any parts (e.g., link rods, transmission shafts and parking baskets), and it is unnecessary to change the cable outlet positions or force the charging cables to enter the cable grooves or pull the charging cables out of the cable grooves along with the movement of the parking baskets, thereby the problems of energy consumption, cable wear, and power utilization/power supply safety related with charging cable winding and releasing can be avoided.

REFERENCE NUMBERS

1—front main frame; 2—rear main frame; 3—upper frame; 4—lower frame; 5—cabling rack; 6—traction chain; 7—central cable outlet unit; 71—central cable outlet port; 72—rotary collar; 8—parking basket; 81—basket beam; 82—automobile carrier; 83—basket post; 84—roller; 85—basket stabilizer bar; 9—charging cable; 10—charging assembly; 11—front driving device; 12—rear driving device; 13—power supply cabinet; 14—basket mounting bracket; 15—front thumb wheel; 16—rear thumb wheel; 17—cable bracket; 18—cable fixing clip; 19—cable guard; 20—rail; 21—central transmission shaft; 22—cable support; 22a—reinforcing rib; 23—bearing; 24—spacer ring; 30—automobile; 100—full-empty area.

EMBODIMENTS

Some embodiments of the present disclosure will be detailed below with reference to the accompanying drawings. It should be understood that the embodiments described herein are only provided to describe and explain the present disclosure, but are not intended to constitute any limitation to the present disclosure.

In the present disclosure, unless otherwise specified, the terms that denote the orientations are used as follows, for example: "top" and "bottom" usually refer to "top" and "bottom" as shown in the accompanying drawings; "inside" and "outside" refer to inside and outside in relation to the profiles of the components. For the convenience of clear explanation, in view of the fact that an automobile usually runs into an vertical circulating parking system from the front side of the vertical circulating parking system (i.e., in the automobile entry direction A shown in FIGS. 2 and 4) when the automobile is to be parked in the vertical circulating parking system, the orientational terms "front" and "rear" used in the present disclosure, such as front main frame 1 and rear main frame 2, usually correspond to the left and right directions in FIGS. 2 and 4; the orientational terms "left" and "right" usually correspond to the left and right directions in FIG. 1 (i.e., top and bottom in FIG. 4).

As shown in FIGS. 1-4, the vertical circulating parking system according to a preferred embodiment of the present disclosure comprises a machine frame, a plurality of parking baskets 8, and a charging system, etc. The machine frame comprises a front main frame 1 and a rear main frame 2 that are arranged apart from and opposite to each other and provided with traction chains 6 respectively. For the convenience of presenting the key components and their connection relations, FIG. 1 only shows the rear main frame 2 and related components connected to it from the perspective of vertical section when viewing rearward, and the traction chains 6 shown are traction chain mounted on the rear main frame 2. Generally, the machine frame may be formed by steel profiles welded together, and serve as a mounting base and a bearing base for the function components, such as parking baskets, etc.

In order to ensure that the machine frame has high overall stability, in a vertical circulating parking system in a preferred embodiment of the present disclosure, an upper frame 3 and a lower frame 4 are connected between the front main frame 1 and the rear main frame 2. It should be understood that the front main frame 1 and the rear main frame 2 may be fixed on the ground by anchor bolts alternatively, and the integrity of them can be enhanced by providing a reinforced concrete foundation.

The traction chains 6 mounted on the front main frame 1 and the rear main frame 2 may be arranged in a racetrack form in the vertical plane and face each other, and can be driven to run in their respective extension directions by driving devices such as motors and transmission devices such as thumb wheels cooperating with the traction chains 6. A plurality of parking baskets 8 are respectively connected to different positions of the traction chains 6 (via the basket mounting brackets 14) in a way that it can be pivoted with respect to the traction chains 6, so that the parking baskets can be move to different parking positions and kept in a horizontal state at the parking positions in an annular running area as the traction chains 6 operate. It can be understood that the parking baskets 8 move in the extension direction of the traction chains 6 as the traction chain 6 operate; however, to keep the automobiles 30 in the parking positions reliably, the parking baskets 8 should be kept in a horizontal state. Therefore, it is necessary to connect the parking baskets 8 in a way that they can pivot with respect to the traction chains 6.

Figure 1:
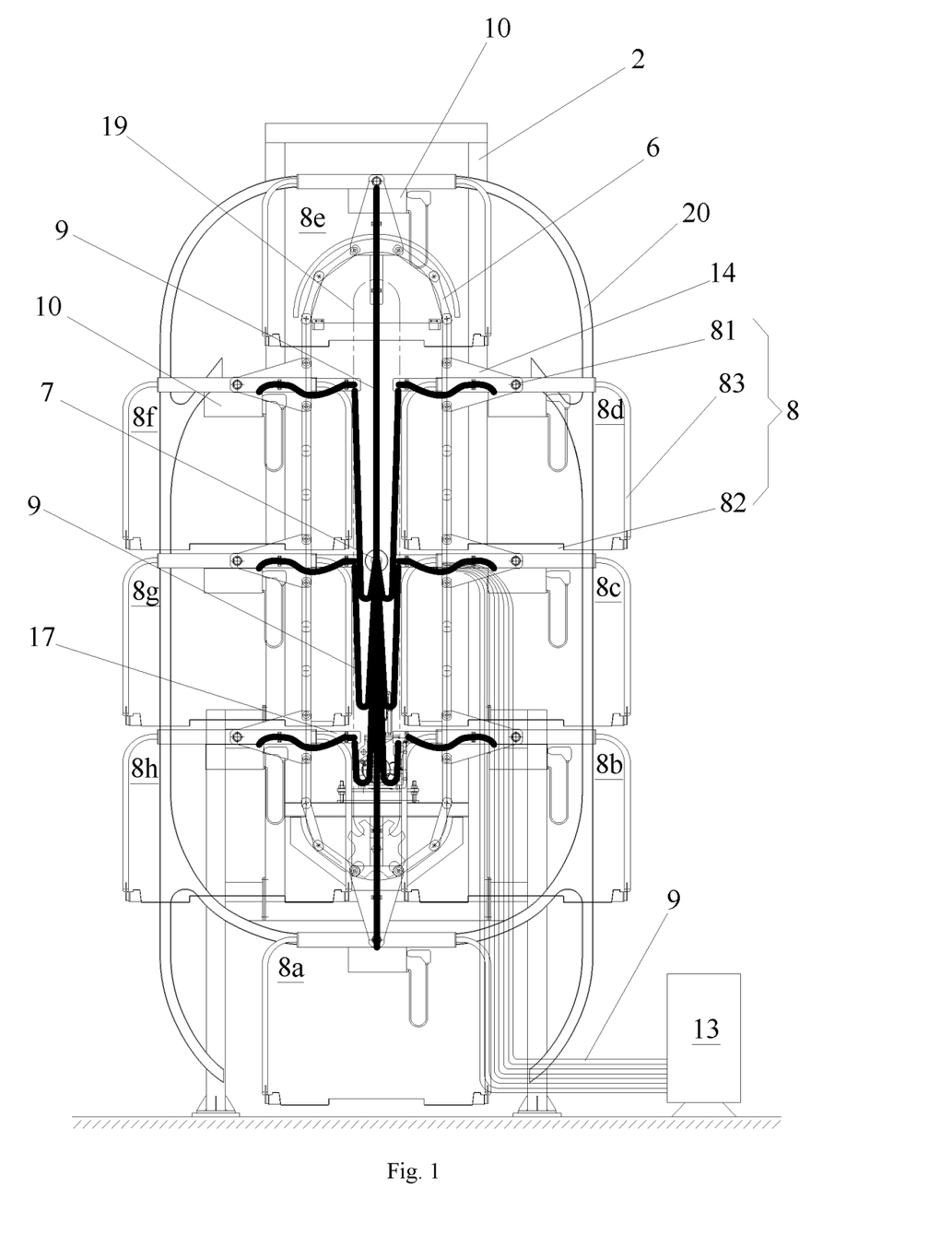
FIG. 1 is a schematic structural diagram of the vertical circulating parking system according to a preferred embodiment of the present disclosure.

Moreover, as the parking baskets 8 move between different parking positions, all the running areas of the parking baskets 8 form an annular running area (when the parking baskets 8 are not allowed to move along the traction chains 6 for a full loop, a single parking basket 8 can only pass through a part of the annular running area), and, at different positions of the vertical section, the cross section of the annular running area and the racetrack-formed plane surrounded by the traction chains 6 form similar figures parallel to each other. For example, in the vertical circulating parking system with eight parking baskets 8a-8h evenly distributed (i.e., first parking basket 8a to eighth parking basket 8h) as shown in FIG. 1, when the traction chain 6 is driven to run counterclockwise so that the first parking basket 8a moves to the position of the second parking basket 8b, the second parking basket 8b rightly moves to the position of the third parking basket 8c. That is to say, (suppose) the parking baskets 8 are allow to move along the traction chains 6 for a loop, the spatial areas swept by the parking baskets 8 superpose each other, i.e., the annular running area. In other embodiments, the vertical circulating parking system may have a different number of parking baskets 8, such as 12 or 16 parking baskets.

The parking basket 8 is provided with charging assemblies, such as chargers and charging guns electrically connected to the chargers. The eight parking baskets 8 shown in the figure are all provided with charging assemblies. In other embodiments, charging assemblies may be provided only on some of the parking baskets 8, so that only some parking spaces in the vertical circulating parking system have the charging function. In order to provide electric power to the charging assemblies, the charging system further comprises a central cable outlet unit 7 and a plurality of charging cables 9 correspondingly diverging from the central cable outlet unit 7 to the charging assemblies, besides the charging assemblies. In other words, the charging cables 9 connecting the charging assemblies are led out centrally and diverge from the central cable outlet unit 7. The central cable outlet unit 7 is electrically connected to an external power supply unit such as a power supply cabinet 13, so that it can supply power to the charging assemblies through the charging cables 9.

Importantly, in the vertical circulating parking system of the present disclosure, the space surrounded by the annular running area where the parking baskets 8 are located is provided with a full-empty area 100 that allows the charging cables 9 to hang down freely, and the cable outlet end of the central cable outlet unit 7 is arranged in the full-empty area 100. Here, the full-empty area 100 means that there is no part that may block the charging cables 9 in the area, for example, the connecting rod connected between the front main frame 1 and the rear main frame 2, and the transmission shaft connected with the front and rear traction chains 6 in the prior art, are omitted, so as to avoid motion interference with the charging cables 9 when the parking baskets 8 move along with the traction chains 6. The cable outlet end of the central cable outlet unit 7 refers to the end of the central cable outlet unit 7 where the charging cables 9 are led from the central cable outlet unit 7 to the extending portions of the charging assemblies.

Figure 2:
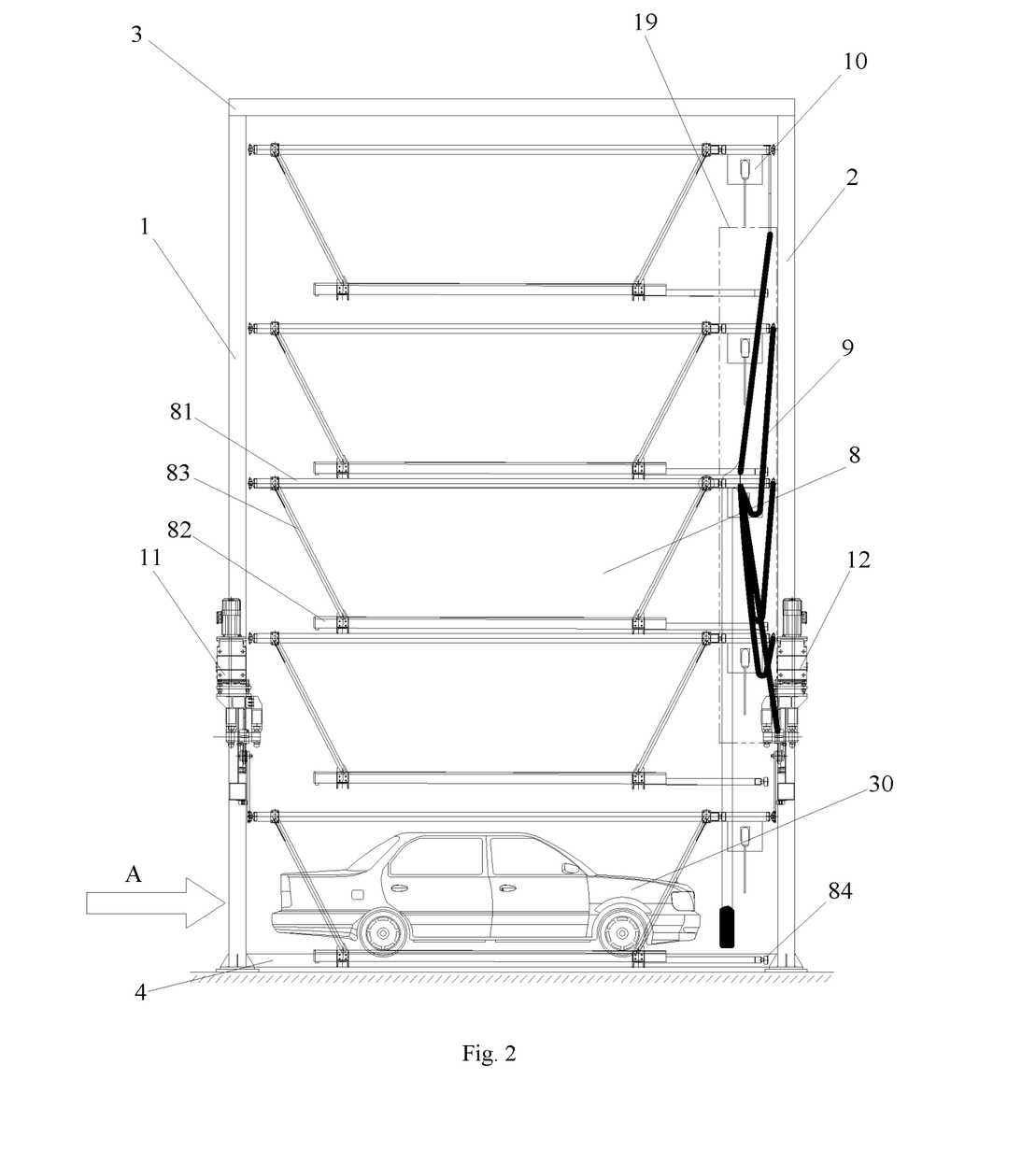
FIG. 2 is a side view of the vertical circulating parking system in FIG. 1, with the traction chains removed.
Figure 3:
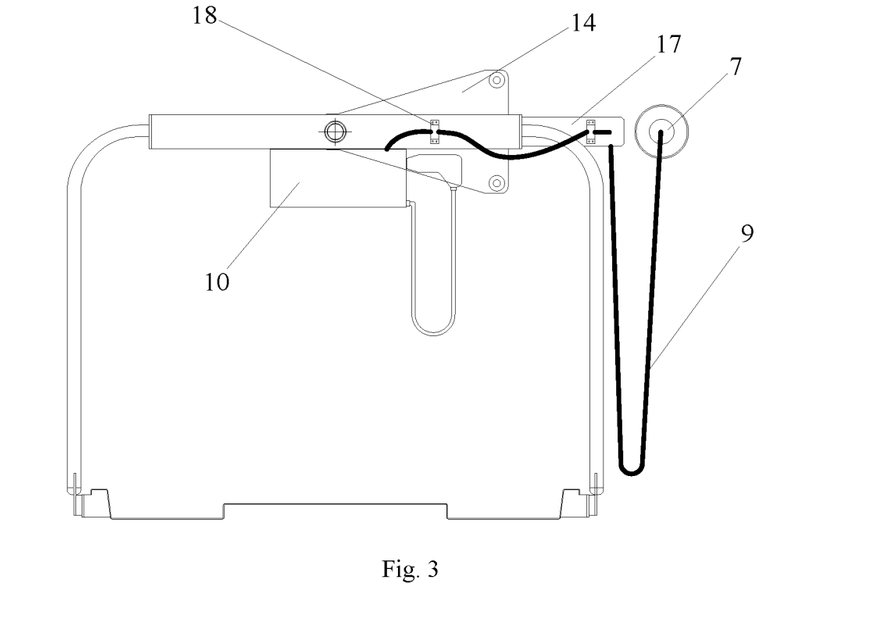
FIG. 3 is a schematic diagram of the mounting structure of the central cable outlet unit, parking baskets, and the extensions of the charging cables from the central cable outlet unit to the charging assemblies on the parking baskets in FIG. 1.
Figure 4:
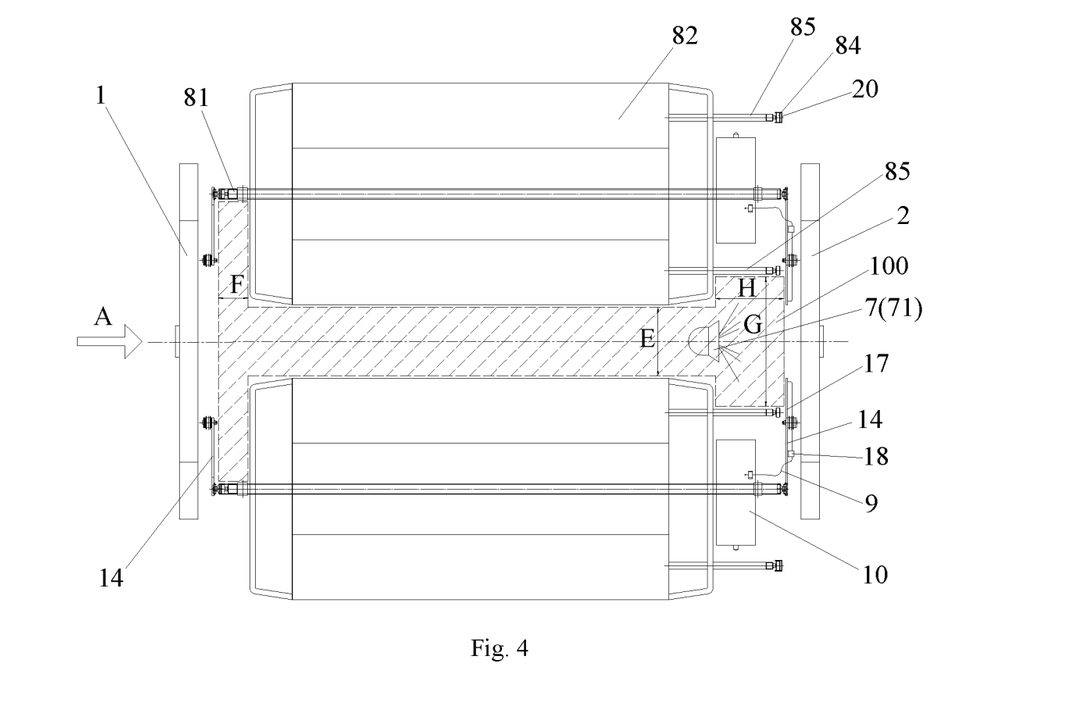
FIG. 4 is a cross-sectional view of the structure of the vertical circulating parking system in FIG. 1.

In order to understand the meaning of the aforementioned full-empty area 100 better, it will now be described with reference to the horizontal section shown in FIG. 4. The I-shaped area shown with the hatch lines is the space surrounded by the annular running area of the parking baskets, and the full-empty area 100 is located in that space. Specifically, the parking basket 8 may comprise a basket beam 81 pivotally connected to the basket mounting bracket 14 (so as to be able to pivot with respect to the traction chains 6), an automobile carrier 82, a basket post 83 connected between the basket beam 81 and the automobile carrier 82, and a basket stabilizer bar 85 connected with rollers 84 (as shown in FIG. 2). At different positions in the front-back direction, the distance between two parking baskets 8 at the same elevation varies; thus, the I-shaped cross-sectional area as shown in the figure is formed.

On the side near the front main frame 1, the basket beam 81 has forward extension length F with respect to the automobile carrier 82 so as to connect the basket mounting bracket 14; thus, the space defined by the basket beam 81, the basket mounting bracket 14 at the front side, and the automobile carrier 82 may be regarded as the full-empty area 100; on the side close to the rear main frame 2, the basket stabilizer bar 85 has backward extension length H with respect to the automobile carrier 82; thus, the space defined by the basket stabilizer bar 85, the automobile carrier 82 and the basket mounting bracket 14 at the rear side within the left-right distance G between two basket stabilizer bars 85 may be regarded as the full-empty area 100; the above-mentioned space between the two areas is defined by the edges of the automobile carrier 82, and may also be used as a full-empty area 100. These empty areas 100 may be used to arrange the cable outlet end of the central cable outlet unit 7; in addition, since all the components of the parking basket 8 move in the annular running area, all the portions with section lines in FIG. 4 represent the three-dimensional space surround by the annular running area.

If the full-empty area 100 is selected to correspond to different positions of the parking baskets 8, the dimensions of related components may be set appropriately to provide a space that can fully accommodate the charging cables 9. For example, if the cable outlet end of the central cable outlet unit 7 is arranged near the rear main frame 2, the rear extension length of the basket beam 81 may be increased appropriately (e.g., 200 mm-800 mm). This also applies to the front side. In addition, different to the prior art in which the overall width is reduced in view of the spatial arrangement, the horizontal spacing E between the parking baskets 8 at the two sides of the central cable outlet unit 7 in the present disclosure may be increased to 400 mm-800 mm, so as to facilitate the arrangement of the central cable outlet unit 7 and enable the charging cable 9 to freely hang.

It should be understood that the full-empty area 100 is mainly configured to prevent the movement of the charging cables 9 from interfered during the movement of the parking baskets 8; therefore, it is only required to avoid the existence of interfering parts in the full-empty area 100, without restricting the arrangement of parts in the space surrounded by the annular running area where the parking baskets 8 are located except the full-empty area 100. For example, in the preferred embodiment shown in FIG. 6, the full-empty area 100 is located near the rear main frame 2, and the cable outlet end of the central cable outlet unit 7 (the rotary collar 72 mounted on the cabling rack 5) is located in the full-empty area 100, while inclined link rods (connected between the front main frame 1 and the cabling rack 5 to improve the stability of the cabling rack 5) may be arranged in the front space surrounded by the annular running area where the parking baskets 8 are located.

With the above technical scheme, in the vertical circulating parking system of the disclosure, the cables are led out centrally and diverge and extend through the central cable outlet unit 7 with the cable outlet end arranged in the full-empty area 100, so that the charging cables 9 can freely hand down in the full-empty area 100 without being blocked or interfered by any parts (e.g., link rods, transmission shafts and parking baskets 8), and it is unnecessary to change the cable outlet positions or force the charging cables 9 to enter the cable grooves or pull the charging cables 9 out of the cable grooves along with the movement of the parking baskets 8, thereby the problems of energy consumption, cable wear, and power utilization/power supply safety related with charging cable winding and releasing can be avoided.

In the present disclosure, the full-empty area 100 may be located at any position in the space surrounded by the annular running area where the parking baskets 8 are located, as long as the area corresponding to the cable outlet end of the central cable outlet unit 7 is formed as the full-empty area 100 allowing the charging cables 9 to freely hang down. However, if the cable outlet end of the central cable outlet unit 7 is offset with respect to the upper or lower side or the left or right side, at least some of the charging cables 9 have a relatively long extension length between the central cable outlet unit 7 and the charging assemblies 10, and may be tangled easily. For that reason, the central cable outlet unit 7 may be arranged in a vertical central plane where the running centers of the front and rear traction chains 6 are located (i.e., the vertical plane where the center line indicated by the dotted lines in FIG. 4 is located). Furthermore, the central cable outlet unit 7 is arranged in the center line where the running centers of the front and rear traction chains 6 are located, so that the charging cables 9 from the central cable outlet unit 7 to the charging assemblies 10 have the same extension length, and the problems of tangling and waste caused by excessively long length of the charging cables can be avoided. For example, in the preferred embodiment shown in FIG. 1, the charging cables 9 may be arranged to essentially extend linearly when the corresponding parking baskets 8 run to the highest or lowest position (where the first parking basket 8a and the fifth parking basket 8e are located); thus, the problem of tangling can be effectively prevented.

As described above, in order to improve the overall stability, an upper frame 3 may be connected between the front main frame 1 and the rear main frame 2. In the preferred embodiment shown in the figures, the upper frame 3 is connected to the top ends of the front main frame 1 and the rear main frame 2. In other embodiments, as long as the upper frame 3 is located above the annular running area where the parking baskets 8 are located, the interference to the movement of the charging cables 9 and the parking baskets 8 can be avoided.

In view that it is necessary to configure the full-empty area 100 to allow the extending portions of the charging cables 9 between the central cable outlet unit 7 and the charging assemblies to freely hang down when the parking baskets 8 move to any position, this embodiment omits the link rods and the transmission shaft that is connected to the traction chains mounted on the front main frame 1 and the rear main frame 2 respectively in the prior art. In that case, the front and rear driving chains can't be driven by a single power means, and unilateral driving is not conducive to maintaining the parking baskets 8 in a horizontal state. In that regard, the illustrated preferred embodiment of the present disclosure is provided with a front driving device 11 and a rear driving device 12 for driving the traction chains 6 mounted on the front main frame 1 and the rear main frame 2 respectively, thereby the traction chains 6 at the front end and the rear end of the parking baskets 8 are driven separately. Here, in order to ensure synchronization, the power output of the front drive device 11 and the rear drive device 12 may be maintained consistent with each other by means of electrical control.

The central cable outlet unit 7 in the present disclosure may be arranged in a variety of appropriate structural forms. In the preferred embodiment shown in FIGS. 1-4, the central cable outlet unit 7 comprises a central cable outlet port 71 allowing the charging cables 9 to pass through, and the charging cables 9 are connected to a power supply cabinet 13 through the central cable outlet port 71. Thus, the charging cables 9 are directly connected to the charging assemblies on the parking baskets 8 from the charging cabinet 13, thereby potential safety problems of electric power utilization caused by exposed connectors can be avoided, and the requirements of safety protection rating for electric power utilization specified in relevant regulations can be met easily. The central cable outlet port 71 may be configured in a flared form to reduce the wear of the charging cables 9 at the central cable outlet port.

In other alternative embodiments, the central cable outlet unit may be configured to connect to a collector slip ring of the power supply cabinet through a single high-power main cable, and charging cables corresponding to different parking baskets may be led out from the collector slip ring. Alternatively, the central cable outlet unit may be configured as a plurality of cable drums, and the charging cables corresponding to different parking baskets may be respectively led out from the cable drums.

Figure 6:
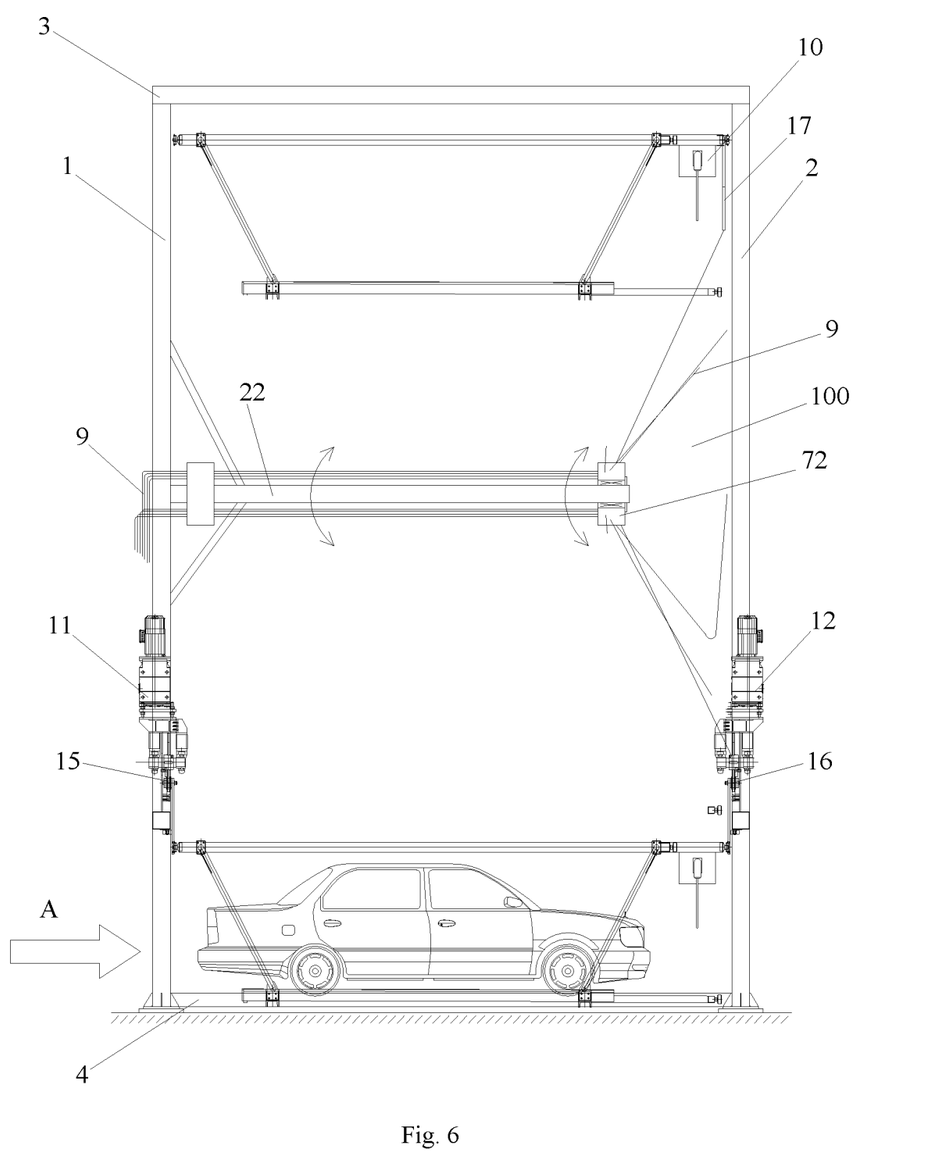
FIG. 6 is a schematic diagram of the mounting structure of the central cable outlet unit of the vertical circulating parking system according to a preferred embodiment of the present disclosure.
Figure 7:
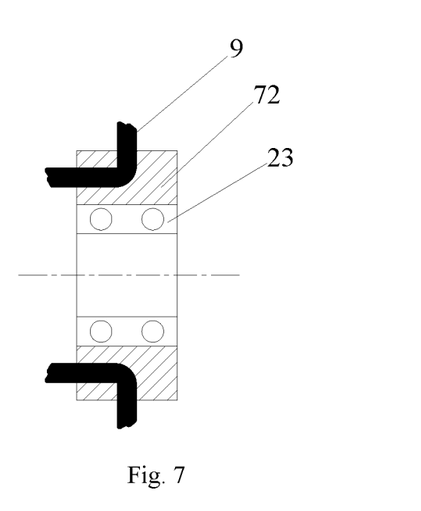
FIG. 7 is an enlarged view of the rotary collar of the central cable outlet unit in FIG. 6.

The vertical circulating parking system shown in FIG. 6 includes a central cable outlet unit in a preferred structural form. The front main frame 1 is connected with a cabling rack 5, and the central cable outlet unit is a rotary collar 72 rotatably mounted on the cabling rack 5. The charging cables 9 extend from the side of the front main frame 1 into the space between the front main frame 1 and the rear main frame 2, and extend along the cabling rack 5 to the vicinity of the free end of the rear main frame 2, and are fixed on the rotary collar 72 at the free end. Thus, since the rotary collar 72 provides the charging cables 9 with certain freedom of rotation, the charging cables 9 can freely rotate on the cabling rack 5 along with the rotary collar 72 when the parking baskets 8 are driven by the traction chains 6 to move between different parking positions, so as to reduce the impact on the torsional fatigue life of the charging cables 9 during the operation. The connection structure between the rotary collar 72 and the charging cables 9 is shown in FIG. 7; specifically, the charging cables 9 are inserted into the rotary collar 72 in the axial direction and extend out of the rotary collar 72 in the radial direction into the full-empty area 100. The rotary collar 72 may be rotatably mounted on the cabling rack 5 via a bearing 23.

In the above preferred embodiment, a fixing collar may be provided at end of the cabling rack 5 near the front main frame 1 for fixing the charging cables 9 when the charging cables 9 are inserted into the space between the front main frame 1 and the rear main frame 2, and the extending portions of the charging cables 9 between the front main frame 1 and the rear main frame 2 may be twisted at a small angle by means of the rotation of the rotary collar 72 with respect to the fixing collar, so as to adapt to the twisting motion of the charging cables 9 in a better way when they move along with the parking baskets 8. In addition, the charging cables 9 may be laid along the outer peripheral surface of the cabling rack 5 as shown in the figure, or the cabling rack 5 may be formed in a hollow structure so that the charging cables 9 pass through the cabling rack 5 and extend toward the rotary collar 72.

Although the present disclosure provides a full-empty space that allows the charging cables 9 to freely hang down, the charging cables 9 may easily be damaged due to excessive torsion if the traction chains 6 and the parking baskets 8 persistently run in a fixed direction when the automobiles are accessed. Generally, the users may access the automobiles simply by means of a control panel, and the operation logic can be executed by a controller in a signal connection with the driving devices. As for whether the parking basket 8 runs clockwise or counterclockwise when a user accesses the car, it is not concerned by the user. In this case, the vertical circulating parking system in the preferred embodiment of the present disclosure is configured to allow the parking baskets 8 to move to-and-fro in the annular running area only for a limited number of loops, preferably not more than one loop.

Figure 5:
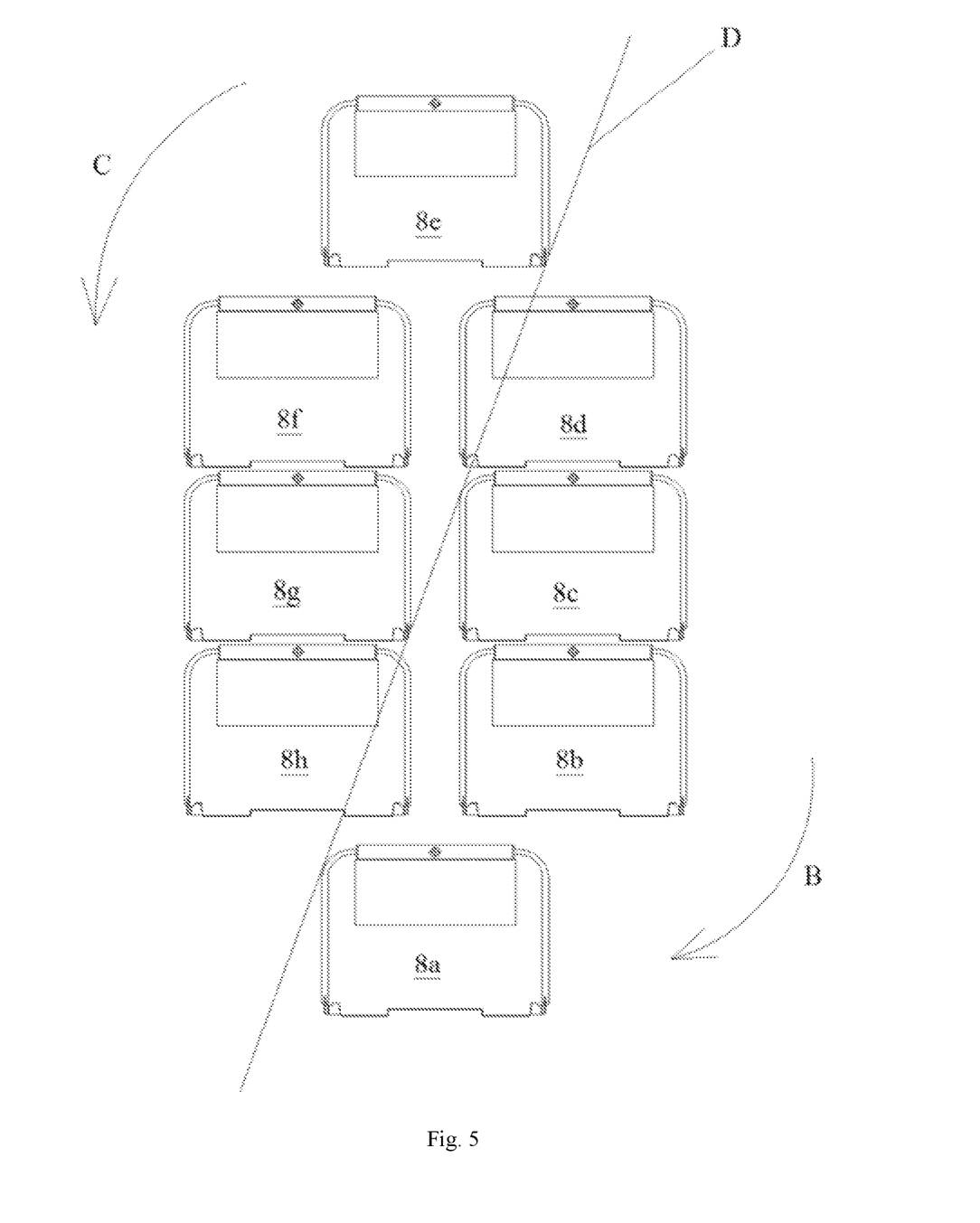
FIG. 5 is a schematic diagram of the automobile accessing logic of the vertical circulating parking system in the present disclosure.

As shown in FIG. 5, eight parking baskets 8 are divided into two groups along a dividing line D. The first group includes a first parking basket 8a, a second parking basket 8b, a third parking basket 8c and a fourth parking basket 8d; and the second group includes a fifth parking basket 8e, a sixth parking basket 8f, a seventh parking basket 8g and an eighth parking basket 8h. For the convenience of illustration, the initial positions of the parking baskets are located at parking spaces 1 # to 8# respectively.

In this case, to access an automobile in the parking space 5 #, the fifth parking basket 8e may be driven to rotate counterclockwise to the bottommost parking space 1 #, while the fourth parking basket 8d initially in the parking space 4 # is moved to the parking space 8 #. To access the automobile on the fourth parking basket 8d, the parking basket 8d can't be further rotated counterclockwise to the parking space 1 # in the shortest path, but must be returned clockwise as indicated by B and rotated to the parking space 1 #. Thus, the torsion damage of the charging cables 9 can be avoided as far as possible, and problems such as tangling and knotting can be prevented.

In the above embodiment, eight parking baskets 8 are divided into two groups along the dividing line D, and the rotation directions of the two groups of parking baskets 8 are different from each other during automobile access. Here, the parking logic of a preferred embodiment is described exemplarily. In other embodiments, the parking baskets 8 may be allowed to move to-and-fro for more than one loop.

As described above, the parking basket 8 may comprise a basket beam 81, an automobile carrier 82, a basket post 83, and a basket stabilizer bar 85, etc., and can be connected to be pivotable with respect to the traction chains 6 via the basket mounting bracket 14 to maintain in a horizontal state at different parking positions. Here, the basket mounting bracket 14 may be a triangular bracket or a T-shaped bracket so as to be connected to the pin shafts at the two ends of the chain links of the traction chains 6. The parking basket 8 is pivotally connected to the basket mounting bracket 14 via its basket beam 81, so that it can be pivoted with respect to the traction chains 6.

In the preferred embodiment shown in the figures, the charging assembly on each parking basket 8 configured as a charger mounted on the basket beam 81 and a charging gun electrically connected to the charger, thereby avoiding occupying the parking space of the automobile carrier 82. In the front-rear direction, the charger may be arranged at one end of the basket beam 81 near the front main frame 1 or the rear main frame 2. Arranging the charger near the front main frame 1 is beneficial for the charging cable 9 to freely hang down, and the extending portion of the charging cable 9 from the central cable outlet unit to the charger is not affected by the basket stabilizer bar 85; thus, the charging cable 9 may be configured to have a shorter extension length; arranging the charger near the rear main frame 2 can reduce the influence on the automobile running into the parking basket 8, and it is unnecessary to worry about the space occupation of the charger in the parking space.

Furthermore, the charging cable 9 extends through the full-empty area 100, and is electrically connected to the charger mounted on the parking basket 8, so that the charging cable 9 has an extending portion that extends into the annular running area where the parking basket 8 is located, and the extending portion should be guided so as to connect to the charger at an appropriate position (a middle position on the left or right of the parking basket 8). For that reason, a cable bracket 17 extending toward the full-empty area 100 may be connected to the basket mounting bracket 14 near the charging assembly (the basket mounting bracket 14 near the rear main frame 2 as shown in the figure), and a cable fixing clip 18 is provided on the cable bracket 17, so that the extending portion of the charging cable 9 extending into the annular running area where the parking basket 8 is located can be fixed with respect to the corresponding parking basket 8.

In order to prevent the charging cables 9 from winding on the parking baskets 8 owing to unexpected external factors (e.g., strong wind), a cable guard 19 covering the extending portions of the charging cables 9 from the central cable outlet unit to the cable bracket 17 may be mounted on the front main frame 1 or the rear main frame 2; thus, the internal space of the cable guard 19 is the full-empty area 100 that allows the charging cables 9 to freely hang.

In the preferred embodiment shown in the figures, the rear main frame 2 is connected with a rail 20, and the end of each parking basket 8 facing the rear main frame 2 is provided with a roller 84 fitted with the rail 20; the roller 84 may be arranged at the end of the basket stabilizer bar 85 facing the rear main frame 2.

Figure 8:
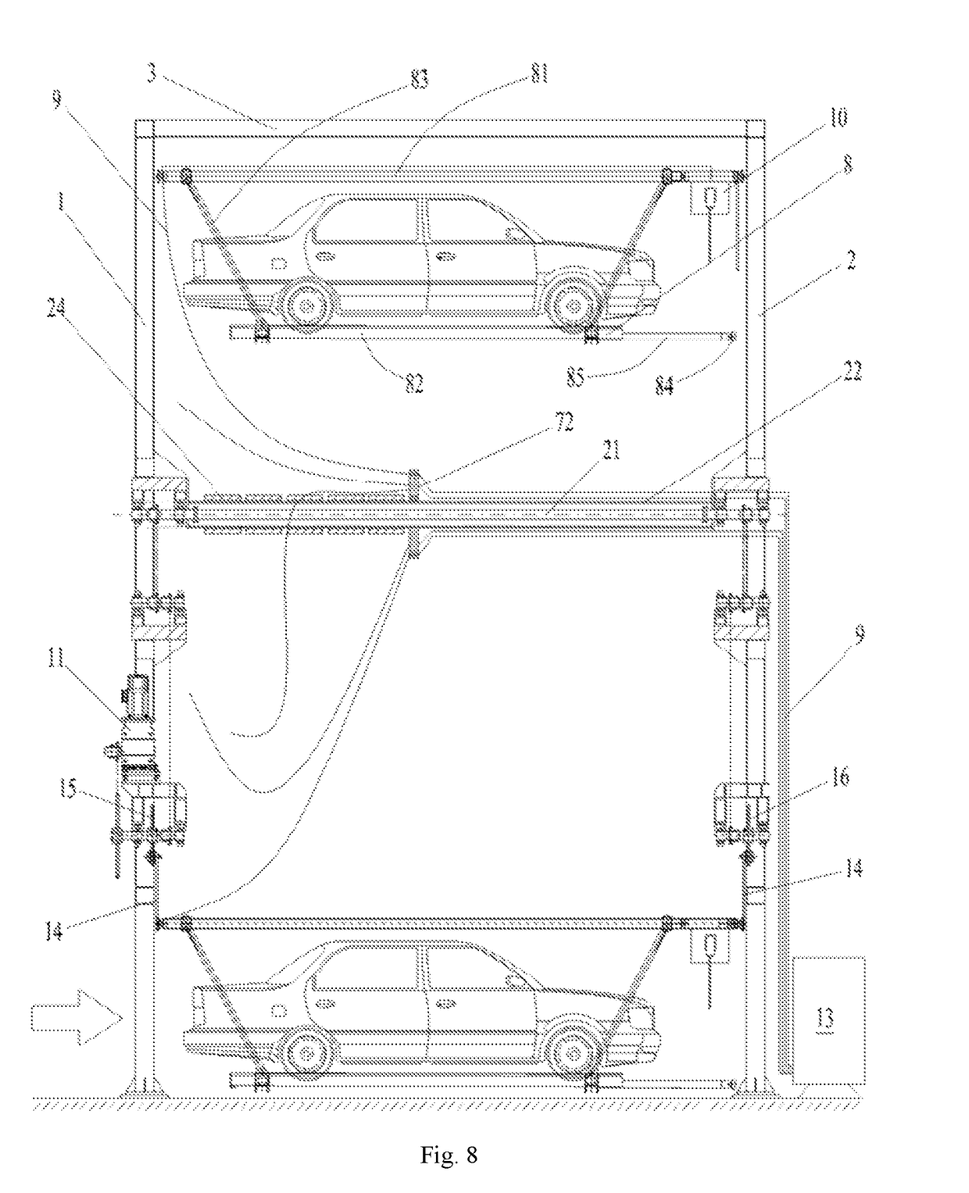
FIG. 8 is a schematic diagram of the mounting structure of the central cable outlet unit of the vertical circulating parking system according to another preferred embodiment of the present disclosure.

As shown in FIG. 8, in the vertical circulating parking system according to another preferred embodiment of the present disclosure, the cable outlet end of the central cable outlet unit with a rotary collar 72 faces the front main frame 1, the charging cables 9 correspondingly diverge from the cable outlet end to the front ends of the parking baskets 8 and are electrically connected to the corresponding charging assemblies 10; thus, the interference with the basket stabilizer bar 85 fitted with the rail can be avoided, and the cabling is more convenient.

Specifically, a cable support 22 is connected between the front main frame 1 and the rear main frame 2, the rotary collar 72 may be mounted on a middle section of the cable support 22 via a bearing, and the charging assembly 10 is arranged at the end of the parking basket 8 near the rear main frame 2.

A spacer ring 24 is freely sleeved on the portion of the cable support 22 between the rotary collar 72 and the front main frame 1, which is to say, the spacer ring 24 can rotate freely on the cable support 22. Thus, the portion of each of the charging cables 9 extending from the rotary collar 72 to the charging assemblies 10 is separated from the cable support 22; when the charging cables 9 freely hang down in the space, they can rotate freely on the cable support 22 along with the spacer ring 24, so as to reduce wear. Here, the spacer ring 24 may be a multi-segment sleeve distributed axially along the cable support 22, thereby the spacer ring 24 has better flexibility in movement and reduce the wear of the charging cables 9.

A transmission mechanism may be provided between the front traction chains and the rear traction chains, so that the front traction chains and the rear traction chains can be driven solely by the front driving device 11 to rotate synchronously. A central driving shaft 21 may be mounted coaxially inside the cable support 22 and connected to a front thumb wheel 15 and a rear thumb wheel 16 via the transmission chains.

Figure 9:
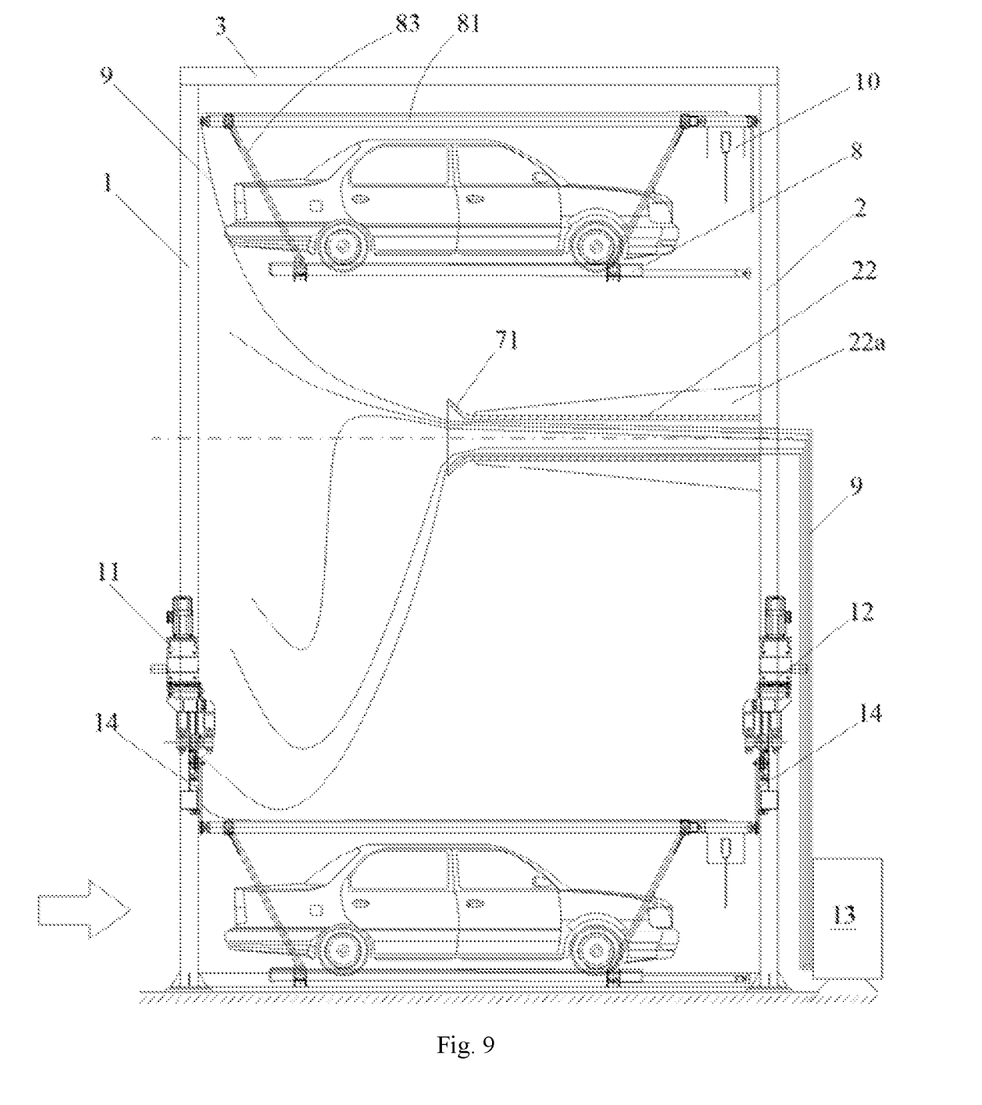
FIG. 9 is a schematic diagram of the mounting structure of the central cable outlet unit of the vertical circulating parking system according to yet another preferred embodiment of the present disclosure.

FIG. 9 shows the vertical circulating parking system in another preferred embodiment, which is similar to the preferred embodiment described above in many aspects, for example, the central cable outlet unit 7 is arranged at a middle position between the front main frame 1 and the rear main frame 2 to avoid any excessive bent of the charging cables 9; the charging cables 9 are directly connected from the charging cabinet 13 to the charging assemblies 10, thereby the safety problem of electric power utilization incurred by exposed connectors can be avoided.

The difference of the preferred embodiment mainly lies in the structure of the cable support 22 and the structure of the central cable outlet unit 7. The cable support 22 is connected to the rear main frame 2 and extends toward the front main frame 1, forming a cantilever structure. The central cable outlet unit 7 is arranged at the free end of the cable support 22 and forms a central cable outlet port 71, so that there is no structure affecting the free hanging of the charging cables 9 near the front main frame 1.

In such a case, reinforcing ribs 22a may be provided on the outer sides of the cable support 22, and the reinforcing ribs 22a are connected to the rear main frame 2 to ensure adequate strength. To facilitate the cabling of the charging cables, the cable support 22 may be formed as a hollow cylinder; thus, the charging cables 9 can extend through the cable support 22, and extend to the parking baskets 8 through the central cable outlet port 71 with a flared opening at the free end.

In the different preferred embodiments described above, the traction chains mounted on the front main frame 1 and the rear main frame 2 may be driven in a variety of ways to operate synchronously; for example, an appropriate transmission structure may be provided between the front main frame and the rear main frame. In a preferred embodiment, to avoid the interference of the driving shaft with the arrangement and movement of the charging cables, the traction chains mounted on the front main frame and the rear main frame may be driven by means of a front thumb wheel 15 and a rear thumb wheel 16, which is to say, a front driving device 11 and a rear driving device 12 are mounted on the front main frame 1 and the rear main frame 2 respectively and are maintained in a synchronous driving state by means of electric control, for example.

Theoretically, in the above preferred embodiment, if the distance between the central cable outlet unit 7 and the charging assembly 10 on the topmost parking basket is equal to the distance between the central cable outlet unit 7 and the charging assembly 10 on the bottommost parking basket, the charging cables 9 can have the shortest extension length after they extend out of the central cable outlet unit 7. However, to avoid any tension damage resulted from dimension errors, usually the charging cables 9 are configured to be longer than their theoretical length. In that case, the distance from the center of the area surrounded by the traction chains to the basket beam 81 of the topmost parking basket is equal to the distance from the center to the basket beam 81 of the bottommost parking basket; if the central cable outlet unit 7 is arranged at the elevation of the center of the area, the freely hanging charging cables 9 will come into contact with the basket beam 81 of the bottommost parking basket and cause abrasion. In view of that problem, the central cable outlet unit 7 may be arranged at an elevation higher than a connecting line between the centers of area surrounded by the two traction chains mounted on the front main frame 1 and the rear main frame 2 by 0-2.5 meters, to avoid or minimize the contact between the charging cable with adequate reserved length and the basket beam 81 of the bottommost parking basket in a free hanging state of the charging cable.

While the present disclosure is described above in detail in some preferred embodiments with reference to the accompanying drawings, the present disclosure is not limited to those embodiments. Various simple variations may be made to the technical scheme in the present disclosure, including combinations of the specific technical features in any appropriate form, within the scope of the technical ideal of the present disclosure. To avoid unnecessary repetition, various possible combinations are not described specifically in the present disclosure. However, such simple variations and combinations shall also be deemed as having been disclosed and falling in the scope of protection of the present disclosure.

The invention claimed is:

1. A vertical circulating parking system, comprising:
a machine frame, comprising a front main frame and a rear main frame that are arranged apart from and opposite to each other and provided with traction chains respectively, wherein the traction chains are connected with a plurality of basket mounting brackets;
a plurality of parking baskets, each of which is respectively connected to different positions of the traction chains via the basket mounting brackets and can be pivoted with respect to the traction chains, so that the parking baskets can be kept in a horizontal state at different parking positions in an annular running area as the traction chains operate, and wherein each of the parking baskets has a basket beam pivotally connected to a corresponding basket mounting bracket; and
a charging system, comprising a central cable outlet unit, charging assemblies respectively arranged on the parking baskets, and a plurality of charging cables correspondingly diverging from the central cable outlet unit to the charging assemblies so as to supply power to the charging assemblies, wherein each of the charging assemblies comprises a charger and a charging gun electrically connected to the charger, wherein the charger is mounted at an end of the basket beam near the front main frame or the rear main frame,
wherein a space surrounded by the annular running area where the plurality of parking baskets are located is provided with a full-empty area allowing the plurality of charging cables to freely hang down, and a cable outlet end of the central cable outlet unit is arranged in the full-empty area, and
wherein the basket mounting brackets near a side of the charging assemblies are connected with a cable bracket extending toward the full-empty area, and the cable bracket is provided with cable fixing clips.

2. The vertical circulating parking system of claim 1, wherein each of the traction chains is defined by an operating center, and wherein the central cable outlet unit is arranged in a vertical central plane where the operating centers of the traction chains respectively mounted to the front main frame and the rear main frame are located.

3. The vertical circulating parking system of claim 2, wherein the central cable outlet unit is arranged in a center line where the operating centers of the traction chains respectively mounted to the front main frame and the rear main frame are located.

4. The vertical circulating parking system of claim 1, wherein the central cable outlet unit is defined by two sides, and wherein a horizontal spacing between the parking baskets arranged at the two sides of the central cable outlet unit is 400 mm-800 mm.

5. The vertical circulating parking system of claim 1, wherein an upper frame is connected between the front main frame and the rear main frame, and the upper frame is located above the annular running area.

6. The vertical circulating parking system of claim 1, wherein the vertical circulating parking system has a front driving device and a rear driving device that are respectively configured to drive the traction chains mounted on the front main frame and the rear main frame.

7. The vertical circulating parking system of claim 1, wherein the central cable outlet unit comprises a central cable outlet port allowing the charging cables to pass through, and the charging cables pass through the central cable outlet port and are connected to a power supply cabinet.

8. The vertical circulating parking system of claim 7, wherein the rear main frame is connected with a cable support that extends toward the front main frame and is a hollow cylinder; the central cable outlet port is configured to be a flared opening formed in a free end of the cable support, and the charging cables extend through the central cable outlet port from an end of the cable support connected to the rear main frame.

9. The vertical circulating parking system of claim 1, wherein the front main frame or the rear main frame is connected with a cabling rack, the central cable outlet unit comprises a rotary collar rotatably mounted on the cabling rack, and the charging cables are fixed to the rotary collar in a way that they can rotate freely with respect to a central axis of the rotary collar as the traction chains operate.

10. The vertical circulating parking system of claim 1, wherein;
the cable outlet end of the central cable outlet unit is oriented to the front main frame,
each of the parking baskets are defined by a front end;
the charging cables correspondingly diverge from the cable outlet end to the front end of the parking baskets, and
the charging cables are electrically connected to corresponding charging assemblies.

11. The vertical circulating parking system of claim 10, wherein a cable support is connected between the front main frame and the rear main frame, the central cable outlet unit is mounted to a middle section of the cable support, and the charging assemblies are arranged at an end of the parking baskets near the front main frame or the rear main frame.

12. The vertical circulating parking system of claim 11, wherein a spacer ring is sleeved on a side of the cable support at the cable outlet end of the central cable outlet unit and configured to separate a portion of each charging cable extending from the central cable outlet unit to each of the parking baskets from the cable support.

13. The vertical circulating parking system of claim 11, wherein the central cable outlet unit is configured to be a rotary collar mounted on the cable support via a bearing, so that the central cable outlet unit can pivot around the cable support.

14. The vertical circulating parking system of claim 1, wherein the vertical circulating parking system is configured to allow the parking baskets to run to-and-fro in the annular running area only for a limited number of loops.

* * * * *